United States Patent [19]

Guazzo

[11] Patent Number: 5,134,824
[45] Date of Patent: Aug. 4, 1992

[54] CONNECTING STAKE WITH A FIXING STIRRUP AND WITH NAILS TO BE PNEUMATICALLY INSERTED FOR THE CONNECTION OF A CONCRETE CASTING ON AN IRON BEAM

[75] Inventor: Francesco Guazzo, Bassano Del Grappa, Italy

[73] Assignee: Tecnaria S.P.A., Bassano Del Grappa, Italy

[21] Appl. No.: 647,918

[22] Filed: Jan. 30, 1991

[30] Foreign Application Priority Data

Feb. 6, 1990 [IT] Italy .................. 64220/90[U]

[51] Int. Cl.⁵ ............................................. E04B 1/16
[52] U.S. Cl. ................................. 52/334; 52/378; 52/733
[58] Field of Search .................. 52/334, 733, 378

[56] References Cited

U.S. PATENT DOCUMENTS

| | | | |
|---|---|---|---|
| 3,450,427 | 6/1969 | Fischer | 52/378 |
| 4,007,563 | 2/1977 | Nakagawa | 52/334 |
| 4,050,346 | 9/1977 | Fischer | 52/378 |
| 4,067,168 | 1/1978 | Thurner | 52/334 |
| 4,406,103 | 9/1983 | Ghali et al. | 52/733 |

Primary Examiner—David A. Scherbel
Assistant Examiner—Joanne C. Downs
Attorney, Agent, or Firm—Bucknam and Archer

[57] ABSTRACT

A connecting stake with a fixing stirrup and nails to be pneumatically inserted for connection with a concrete casting on an iron beam, comprises a staff (1) of cylindrical section and predetermined length, provided with an upper head (2) of a greater diameter, and with a lower bar of slightly lesser diameter. The lower bar has an end. The stake (1) has a shaped plaque (3) provided with two lateral openings (7) and (8), the plaque having a central opening, the end of the bar being riveted in the central opening. The nails (9) and (10) are predisposed in the lateral openings and are held within the openings by two thin sheaths (11) and (12). The concrete casting has an upper flange and the nails are inserted in the upper flange by means of a pneumatic nailing machine. The concrete casting is subsequently applied on the upper flange. The plaque (3) is provided with lateral wings (4) and (5) emerging from the plaque, whereby said stake is reinforced.

2 Claims, 3 Drawing Sheets

CONNECTING STAKE WITH A FIXING STIRRUP AND WITH NAILS TO BE PNEUMATICALLY INSERTED FOR THE CONNECTION OF A CONCRETE CASTING ON AN IRON BEAM

The present invention relates to connecting stakes for beams and more specifically to connecting stakes of cylindrical shape which are inserted within the flange of a beam made of steel. More specifically, the present invention provides a connecting stake of cylindrical shape provided in the lower part with a fixing stirrup or predisposed nails capable of being inserted pneumatically within the flange of a steel beam for the purpose of strengthening the connection between the slab made of concrete which is above and the beams made of steel which are disposed beneath the slab.

It is known for some time that structures made of steel and concrete, particularly for the purpose of manufacturing slabs made of a conglomerate and supported by metallic beams have been used. The stakes mentioned hereinabove actually are simply soldered electrically to the upper surface of the beams made of steel and emerge from them in a manner to remain conglomerated in the concrete bed of the slab.

The mounting of these connectors requires an operation of electric soldering to be carried out on the beams already placed in operation, a fact which involves difficulties not always easy to overcome by the operators.

The crux of the present invention resides in the fact that the connecting stake, being initially provided with a fixing stirrup with nails predisposed in the openings of the same stirrup, is mounted on the flange of the beam by means of a pneumatic riveting machine which inserts the nails in the flange of the structural section so that a perfect and stable fixing is achieved, both when the connecting stake is mounted directly on the flange of the beam as well as when it is mounted through the interposition of a plate in a fret shape which supports the casting of the concrete slab placed above it.

The invention is illustrated by reference to the accompanying drawings of which:

Figures 1, 2:
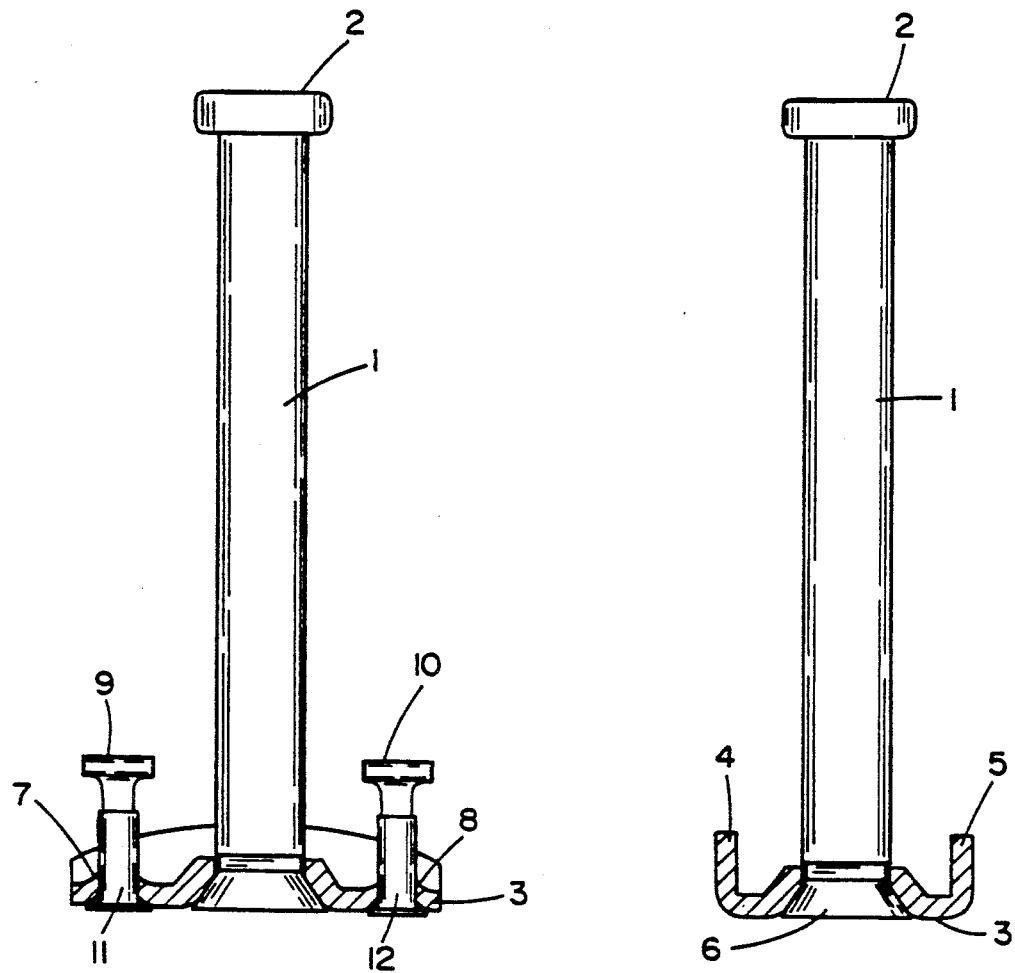
FIG. 1 is an elevational view of the connecting stake of the present invention.
FIG. 2 is a side view of the same stake.
Figure 3:
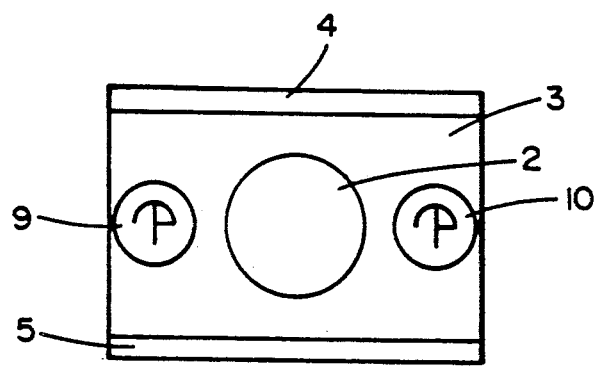
FIG. 3 is an elevational vertical view in cross section of the connecting stake mounted on the flange of a beam in the shape of a double "T" also in vertical cross section.

As it is shown in FIGS. 1, 2 and 3, the connecting stake is constituted by a cylindrical rod (1) provided with a head of enlarged diameter (2) obtained by cold heading and also with a base plaque (3) of rectangular shape with two lateral borders (4) and (5) which rigidify the structure and which are obtained by bending in the cold the steel plate.

The fixing of the stake (1) to the base plate (3) is obtained by riveting the lower part of the stake (1) of reduced diameter so as to form a conical portion (6) which ends on the level of the bottom surface of the base (3). The latter is provided with two orifices (7) and (8) within which the nails (9) and (10) are inserted, the nails being advantageously coated with two thin cylindrical sheaths (11) and (12) which permit to maintain the nails (9) and (10) inserted in them in position for mounting or inserting during storage as well as during the transportation and when the fixing operation is carried out.

Figure 4:
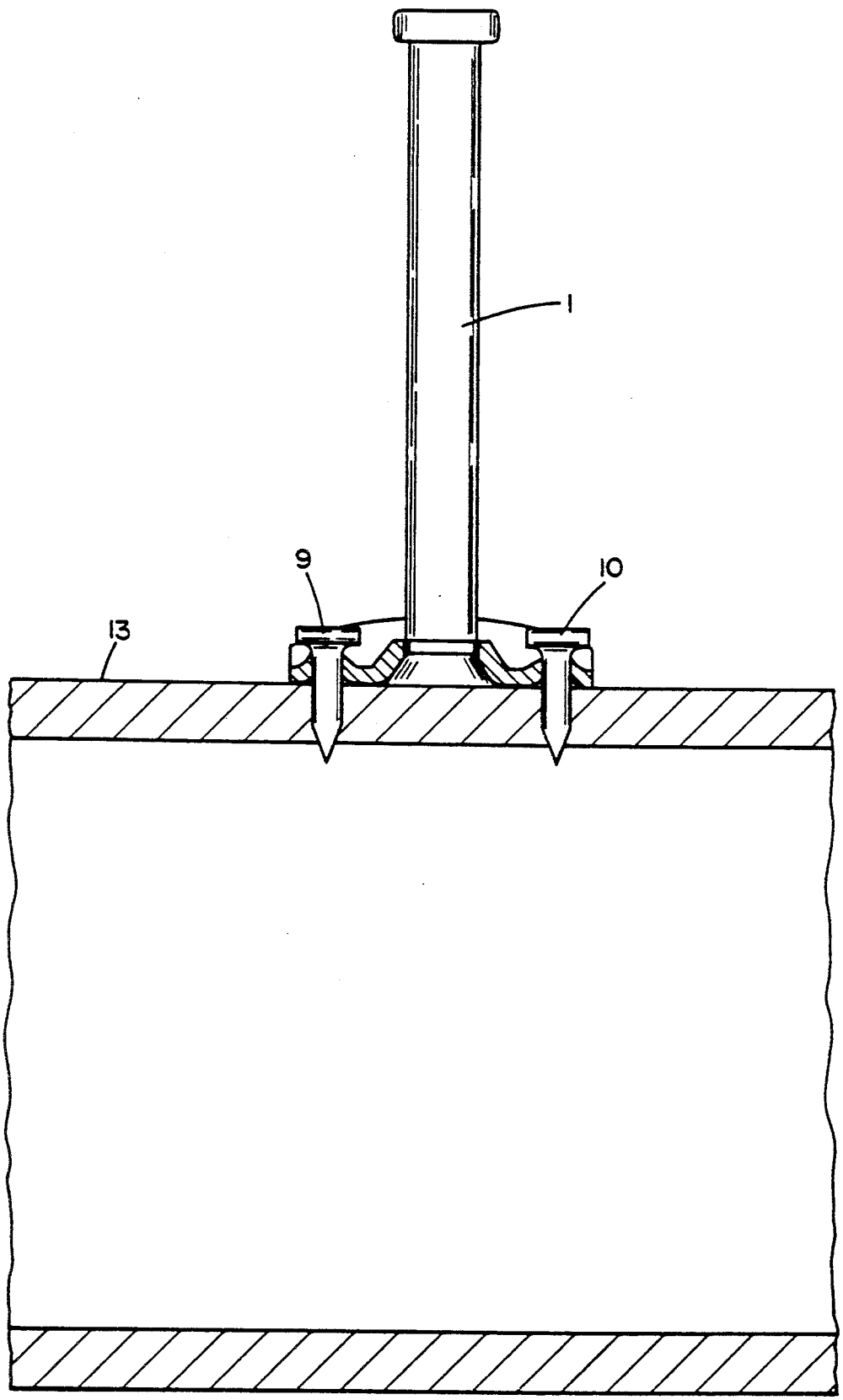
FIG. 4 illustrates the same connecting stake mounted on the flange of a beam in the shape of a double "T"

The fixing operation is obtained by means of a pneumatic nailing machine which acts on the heads of the nails (9) and (10) as shown in FIG. 4 so that the tips of the same nails penetrate within the flange (13) of the beam made of iron on which the stake (1) is intended to be fixed.

Figure 5:
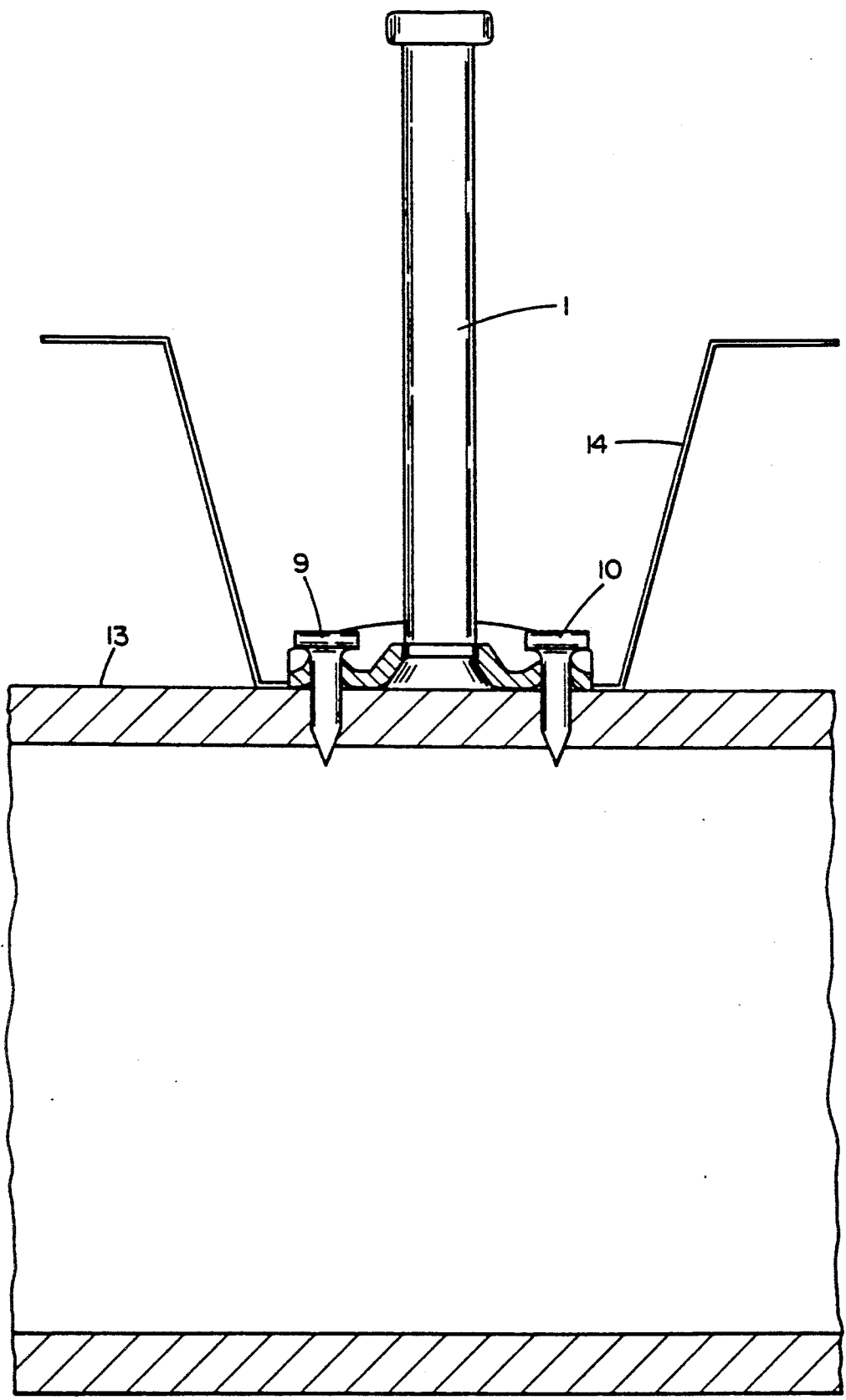
FIG. 5 illustrates the same connecting stake mounted on a beam in the shape of a double "T" with the interposition of a fret shaped plate.

The object may also be achieved by means of the interposition of the fret shaped plate (14) shown in FIG. 5 when the latter is interposed between the connecting stake (1) and the upper flange of the beam (13).

The advantages according to the connecting stake to the present invention are obvious because the fixing operation does not require the use of a soldering machine but only the use of a pneumatic nailing machine is involved by means of which the nails (9) and (10) are placed on the flange of the beam, the nails being predisposed on the base plaque which is advantageously reinforced by the stake.

What is claimed:

1. A connecting stake with a fixing stirrup and nails to be pneumatically inserted for connection with a concrete casting on an iron beam, which comprises a staff (1) of cylindrical section and predetermined length, provided with an upper head (2) of a greater diameter, and with a lower bar of slightly lesser diameter, said lower bar having an end, said stake (1) having a shaped plaque (3) provided with two lateral openings (7) and (8), said plaque having a central opening, said end of said bar being riveted in said central opening, said nails (9) and (10) being predisposed in said lateral openings and being held within said openings by two thin sheaths (11) and (12), said concrete casting having an upper flange, said nails being inserted in said upper flange by means of a pneumatic nailing machine, said concrete casting being subsequently applied on said upper flange, wherein said plaque (3) is provided with lateral wings (4) and (5) emerging from said plaque, whereby said stake is reinforced.

2. The stake according to claim 1 wherein said concrete casting is interposed by means of a fret shaped plate (14) which limits said casting.

* * * * *